United States Patent [19]

Leusden et al.

[11] 4,074,494

[45] Feb. 21, 1978

[54] LARGE-SIZE PLATE-SHAPED BUILDING ELEMENTS AND PROCESS FOR MAKING THE SAME

[76] Inventors: Carl Otto Pels Leusden, von Ossietzky-Ring 8, 43 Essen 14; Robert Stupperich, Janssenstr. 5, 43 Essen 1; Hans-Bernd Weber, Lunerkamp 20, 43 Essen 13, all of Germany

[21] Appl. No.: 532,549

[22] Filed: Dec. 13, 1974

[30] Foreign Application Priority Data

Dec. 13, 1973 Germany ............................ 2361945

[51] Int. Cl.[2] ........................ E04C 2/04; C04B 33/30; C04B 33/32

[52] U.S. Cl. ........................................ 52/606; 264/60; 264/DIG. 43

[58] Field of Search .................. 52/606, 310; 425/446; 264/DIG. 44, 333, 57, 64, 82, 338, 79, 60, DIG. 43; 249/115, 119

[56] References Cited

U.S. PATENT DOCUMENTS

| | | | |
|---|---|---|---|
| 859,616 | 7/1907 | Repetto | 52/218 |
| 865,266 | 9/1907 | Pauly | 425/446 |
| 899,799 | 9/1908 | Pauly | 425/446 |
| 1,009,557 | 11/1911 | Pauly | 264/DIG. 43 |
| 1,164,099 | 12/1915 | Kline | 249/115 |
| 1,554,586 | 9/1925 | Lake | 264/DIG. 43 |
| 1,684,624 | 9/1928 | Hayden | 249/113 |
| 1,744,309 | 1/1930 | Henderson | 264/DIG. 43 |
| 1,960,571 | 5/1934 | Butterworth et al. | 264/338 |
| 2,138,683 | 11/1938 | Weesner | 52/310 |
| 2,170,936 | 8/1939 | Baron | 264/82 |
| 2,539,177 | 1/1951 | Baylor | 52/218 |
| 2,663,063 | 12/1953 | Van Loon | 249/64 |
| 2,757,432 | 8/1956 | Lambie | 264/79 |
| 3,188,226 | 6/1965 | Jense | 264/338 |
| 3,424,607 | 1/1969 | Coscia | 264/338 |
| 3,427,178 | 2/1969 | Zakim et al. | 249/115 |
| 3,844,527 | 10/1974 | Scott | 249/112 |

*Primary Examiner*—James L. Ridgill, Jr.
*Attorney, Agent, or Firm*—Allison C. Collard

[57] ABSTRACT

In a process for making large-size building elements called "plate bricks" of ceramic material, which comprises preparing the ceramic material, forming it to large-size plate-shaped bricks, drying and burning the same, the improvement which consists of drying the element evenly over the cross section after forming. The invention also relates to the brick made by the process.

12 Claims, 2 Drawing Figures

LARGE-SIZE PLATE-SHAPED BUILDING ELEMENTS AND PROCESS FOR MAKING THE SAME

The invention relates to making large size building elements of ceramic material in the shape of plates or boards, which in the following will be called "plate bricks" (German "Plankenziegel"). The process comprises preparing the ceramic material, forming it to plates, drying and burning. In the art of building walls, it is advantageous to use bricks, for several known reasons. The disadvantage consists in the small size of the conventional brick which results in high expenses for labor and in the many joints, which are inconvenient during the laying, and for physical reasons as well.

When other building materials are used, e.g. concrete, the practice has been for quite some time to use large-size building elements, e.g. of the height of walls and of a width of several meters. However, similar large-size elements of ceramic material could not be made up to now for the following reasons:

Practical experience has shown that the production difficulties in the brick industry, i.e. in making building elements of ceramic material, grow out of proportion with the size of the elements. Especially the drying step, where high shrinkage is involved, is up to now an unsurmountable obstacle in making large-size building elements of ceramic material, or "plate bricks". As a matter of fact, the shrinkage occurring upon drying lies between 5 and 10%. As a consequence, cracks and deformations of the building elements result. This is of less importance in comparatively small elements, such as ordinary building bricks, but cannot be tolerated in large-size building elements of ceramic material.

An object of this invention is to provide a process for making plate bricks, namely large-size building elements of ceramic material. The main feature according to the present invention consists of drying the ceramic material evenly over the entire cross section of the formed plate brick. It has been found by the inventors that the shrinkage occurring during drying and burning of the ceramic material is, in itself, not an obstacle in making plate bricks. In other words, the unavoidable shrinkage will not necessarily lead to crack formation or to deformation of the bricks, namely, when the drying is carried out evenly over the entire cross section of the brick.

It is another feature of the invention to subdivide the plate brick into a plurality of tubes in such a manner that the hydraulic diameters of the tubes and their wall thicknesses will effect an even drying of the entire cross section when dry air is passed through the tubes. It is to be understood that the plate brick produced is still a monolithic body, whose cross section is only theoretically subdivided into several tubes. Thus, the required even drying over the entire cross section of the formed plate brick is achieved, as it were, by subdividing the entire plate brick into a plurality of "objects to be dried" with the understanding that each of these objects has to be uniformly dried.

For the particulars of the process, there are a number of possibilities of carrying it out and developing it, some of which are described by way of example in the following specification.

There is first the possibility of making all the tubes, of which the plate brick is considered to be composed, of about the same hydraulic diameter and about the same wall thickness. This has the advantage that the same dry air, of the same temperature, the same moisture content, and the same velocity passes through all tubes. However, there also exists the possibility of providing several groups of tubes, where all the tubes of one group have about the same hydraulic diameter and about the same wall thickness. For example, we may arrange groups of outer and inner tubes, wherein the hydraulic diameters of the tubes of the outer groups may be larger or smaller than the hydraulic diameters of the tubes of the inner groups. By appropriate dimensioning of the wall thicknesses — larger thicknesses with larger hydraulic diameters — this embodiment of the process of the invention may likewise lead to an even drying of the ceramic material over the entire cross section of the brick, by passing dry air of the same temperature, same moisture content, and same velocity through every one of the tubes. There exists, however, the possibility of passing dry air through individual tubes of different temperature, different moisture content, and/or different velocity. In the latter embodiment, the parameters of the dry air such as temperature, moisture content, and velocity, must be mutually adjusted so that in the end, the entire cross section of the plate brick is evenly dried.

Another teaching of the invention is of great importance, wherein dry air is passed through the tubes alternately in different directions. By this arrangement the drying of the ceramic material, occurs equally and symetrically over the length of the brick, observed from its center. This will be particularly true when, according to another teaching of the invention, the drying period during which the air is passed through the tubes in one direction, is chosen so that the moisture withdrawn from the plate brick equals the mean value of the moisture withdrawn through the previous drying period and the subsequent drying period. Finally, it is advantageous to make the drying periods when the dry air passes through the tubes in one direction, so short that the local shrinkage differences remaining between the several tubes, or groups of tubes, after the drying will lie within the elastic deformability of the plate brick. In this manner, any deformation of the plate brick made according to the invention will be theoretically completely avoided, and in practice avoided with sufficient accuracy.

In the application of the process according to the invention, and in accordance with further teachings thereof, the drying of the plate brick can be so adjusted by the temperature, moisture content, and/or velocity of the dry air, that no condensation will take place within the tubes. The drying velocity may also be increased corresponding to the temperature reached and/or the dryness of the brick plate. Thus, the known fact is made use of that the maximal possible drying velocity of ceramic material depends on the temperature and the moisture content of the ceramic material to be dried.

It was discussed above, how the fundamental idea of the invention, i.e. to evenly dry the entire cross section of the formed plate brick, can be realized in practice. It has been shown that the drying of the ceramic material is practically effected by passing drying air through the plate brick in a special manner. In order to make sure that the drying of the ceramic material actually occurs only by the dry air passed through the plate brick, it is advisable to prevent the drying of the plate brick over its outer surfaces by special measures. For that purpose, the outer surfaces of the plate brick may be covered by a water and steam-proof sheet such as a foil, or they may be coated with an oil, varnish, or glue layer. However, it is also possible to include the outer surfaces of the plate brick intentionally in the drying of the ceramic material. This can be done e.g. by making the outer surfaces during the drying step into additional tubes by means of plates or the like, so that the dry air is then passed through the additional tubes. This procedure will be applied when the plate brick is made so that the outer wall thicknesses are larger than the inner ones. If both wall thicknesses are to be the same or nearly the same, it is advisable to arrange several plate bricks with their outer walls adjacent to each other and to cover only the free outer surfaces with a water or vapor-proof sheet such as a foil, or a coating of oil, varnish or glue. It is also possible to make them into additionaly tubes by means of plates and the like so that dry air is passed through the additional tubes as well. In that case, it is advisable to make the plates forming the additional tubes from the same ceramic material as the plate brick, to make them of the same wall thickness as the correlated outer walls of the plate brick, and to let the additional tubes have the same hydraulic diameters.

Finally, it may be that for structural or physical reasons, cross sections of tubes may be requested in a plate brick, which deviate considerably from the cross sections of the other tubes. In that case those tubes should be dimensioned so that they are practically without wall thickness, and furthermore that through these tubes practically no drying of the ceramic material takes place. This can be done by applying a water or vapor-proof sheet to the inner wall surfaces of these tubes, such as a foil, or an oil, varnish or glue coating, or by sealing the inlets or outlets of the tubes against the entrance of dry air.

In the following, the invention will be more particularly described with reference to the accompanying drawing, which represents embodiments of the invention by way of exemplification only, of which:

Figure 1:
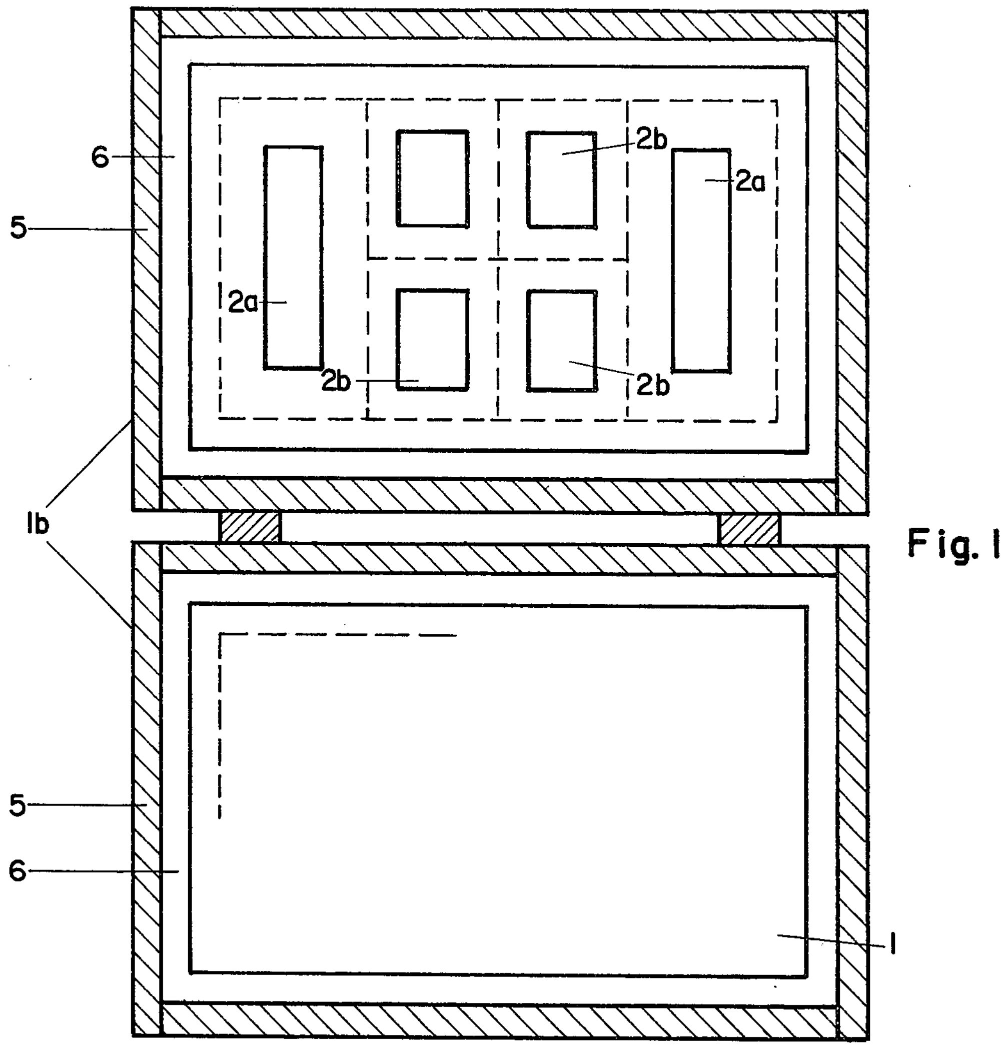
FIG. 1 is a cross-sectional view of one embodiment of a plate brick.

Referring to the drawings, the bricks are placed in a drying plant (not shown), in which the bricks, generally designated by 1*a* and 1*b*, are dried evenly over the entire cross section. For that purpose, the plate bricks are composed of a plurality of tubes 2 arranged adjacent to each other and having hydraulic diameters and wall thicknesses which will ensure the desired even drying of ceramic material over the entire cross section of the brick. Dry air is passed through tubes 2.

Figure 2:
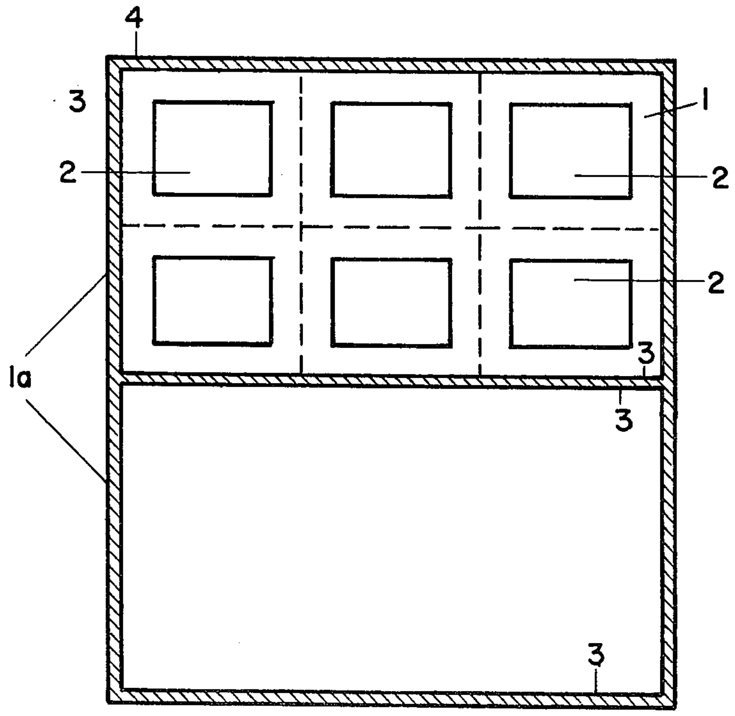
FIG. 2 is a similar view of another embodiment of a plate brick.

As shown in the drawing, several embodiments of plate bricks are dried in the drying plant. One embodiment is illustrated in FIG. 2, where two bricks 1*a* are composed of tubes 2 all having the same hydraulic diameter and the same wall thickness. In that case, dry air of the same temperature, moisture content, and velocity is passed through the tubes. However, when contrary to the embodiment shown, tubes of different diameter and wall thickness are to be used, a complete drying may be effected by passing therethrough dry air of appropriately different temperature, moisture content, and velocity.

Two bricks are shown having outer walls 3 placed one against the other, to prevent drying from the outside of the brick. The other three walls of each brick, 3*a* and 3*b*, which are exposed to the outside, are covered by a water or vapor-proof sheet, or coated with oil, varnish, or glue.

FIG. 1 shows embodiment 1*b* composed of groups of tubes 2*a* and 2*b*, which are of different diameters and wall thicknesses. Also shown in this embodiment are plates 5 and 7, which are placed around the bricks during the drying period, thereby forming additional tubes 6. The plates are of the same ceramic material as the brick and their wall thickness is also the same as that of the correlated outer tube wall. The additional tubes 6 have furthermore the same hydraulic diameter as the neighboring tubes.

As mentioned before, the plate bricks are dried in the plant (not shown) by passing dry air in alternating directions through tubes 2, the drying period, during which the air is passed through the tubes in one direction is so chosen so that the moisture withdrawn from plate bricks 1*a* or 1*b* equals the mean value of the moisture withdrawn during the previous and the subsequent drying periods. In addition, it is advantageous to make the drying periods, during which the dry air passes through the tubes in one direction, so short that the local shrinkage differences remaining after the drying between the several tubes 2 or groups of tubes 2*a* and 2*b*, respectively, will lie within the elastic deformability of the plate brick.

Moreover, arrangements are made in the drying plant for checking the drying of the plate bricks by means of adjusting the temperature, moisture content and/or velocity of the dry air in such a manner that the drying velocity may be increased corresponding to the temperature reached and/or the dryness of the brick. Also, the adjustment will prevent condensation from taking place within the tubes.

While only a few embodiments of the present invention have been shown and described, it will be obvious to those skilled in the art that many changes and modifications may be made thereunto without departing from the spirit and scope of the invention.

What is claimed is:

1. Plate bricks made of ceramic material in the shape of plates or boards, so as to achieve uniform shrinkage and avoid shrinkage differences, and cracking, or deformation during drying comprising a plurality of adjacent parallel groups of pipes forming a unitary element wherein said groups of pipes comprise at least one pipe, and each of said plurality of groups of pipes have the same hydraulic diameter and the same wall thickness, and made in accordance with the process comprising the steps of:

(a) forming wet ceramic material into a monolithic body or blank subdivided into and containing members each having walls surrounding a plurality of open-end parallel tubular passages of approximately the same hydraulic cross-section, each said walls having substantially the same and a constant and uniform thickness, said passages being separated by common walls;

(b) passing drying air solely through said passages at a temperature and velocity effective to reduce the moisture content evenly over the entire cross-section of the formed body while avoiding deformation or crack formation, and the hydraulic cross-sections together with the wall thickness effecting an even drying of the cross section when said dry air is passed through said passages;

(c) preventing drying of the outer surfaces while simultaneously passing said drying air solely through said passages by maintaining thereon a covering layer of waterproof and steamproof material; and (d) burning the dried building element.

2. Process for the manufacture of large-size building elements of ceramic material in the shape of plates or boards, so as to achieve uniform shrinkage, and avoid shrinkage differences, and cracking, or deformation during drying, comprising the steps of:

(a) forming wet ceramic material into a monolithic body or blank subdivided into and containing members each having walls surrounding a plurality of open-end parallel tubular passages of approximately the same hydraulic cross-section, each said walls having substantially the same and a constant and uniform thickness, said passages being separated by common walls;

(b) passing drying air solely through said passages at a temperature and velocity effective to reduce the moisture content evenly over the entire cross-section of the formed body while avoiding deformation or crack formation, and the hydraulic cross-sections together with the wall thickness effecting an even drying of the cross section when said dry air is passed through said passages;

(c) preventing drying of the outer surfaces while simultaneously passing said drying air soley through said passages by maintaining thereon a covering layer of a waterproof and steamproof material; and, (d) burning the dried building element.

3. The process according to claim 2 further comprising the step of passing the drying air through said pipes with a constant speed, moisture and temperature, respectively while simultaneously preventing said drying of the outer surfaces to obtain an even drying.

4. The process according to claim 2 further comprising the steps of controlling the drying of the unitary element by the temperature, the moisture and/or the speed of the drying air flow such that the drying speed is increased with increased temperature and/or increased drying of the element.

5. The process according to claim 2 wherein said layer is a foil.

6. The process according to claim 2 wherein said layer is an oil.

7. The process according to claim 2 wherein said layer is a varnish.

8. The process according to claim 2 wherein said layer is a glue layer.

9. The process of claim 1 in which the drying air in step (b) is passed through the passages in the same direction.

10. The process of claim 2 in which the drying air is passed through the passages alternately in different directions.

11. The process according to claim 2 further comprising the step of alternately feeding said drying air through the passages in different directions.

12. The process according to claim 2 further comprising selecting a drying period for the drying air which flows through the pipes in one direction such that the moisture which is removed from the element consists of a mean value of a preceeding and subsequent drying period.

* * * * *